Aug. 23, 1966   J. DREEBEN   3,268,040
CLUTCH AND BRAKE MECHANISM
Filed July 2, 1964                                              2 Sheets-Sheet 1

INVENTOR
JACK DREEBEN

BY *B.T. Wolvensmith*

ATTORNEY

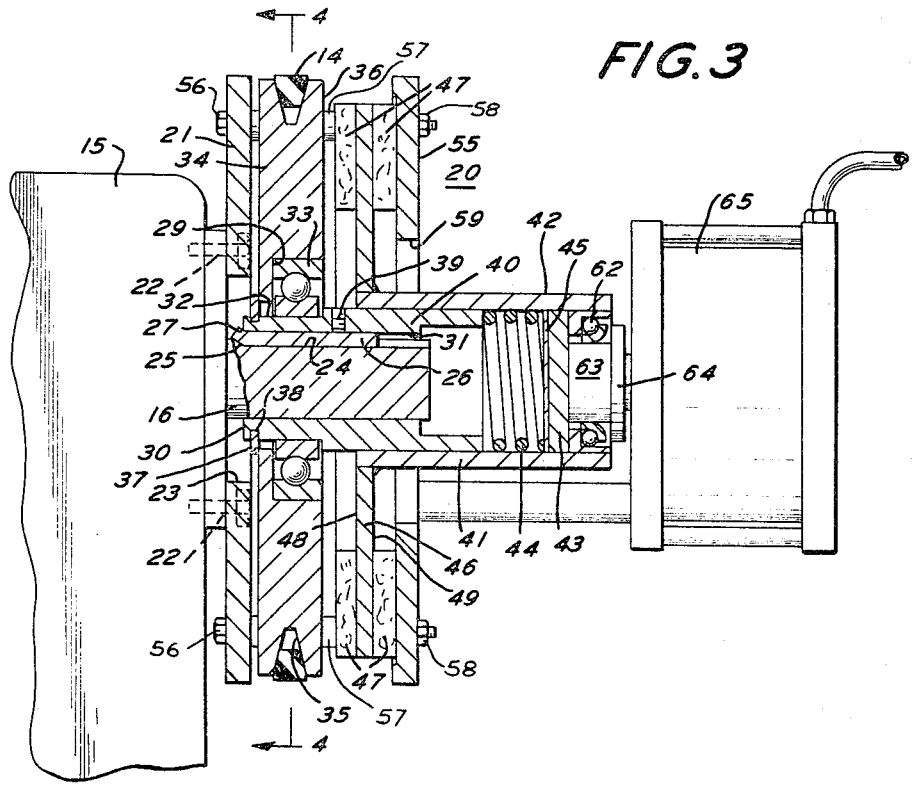
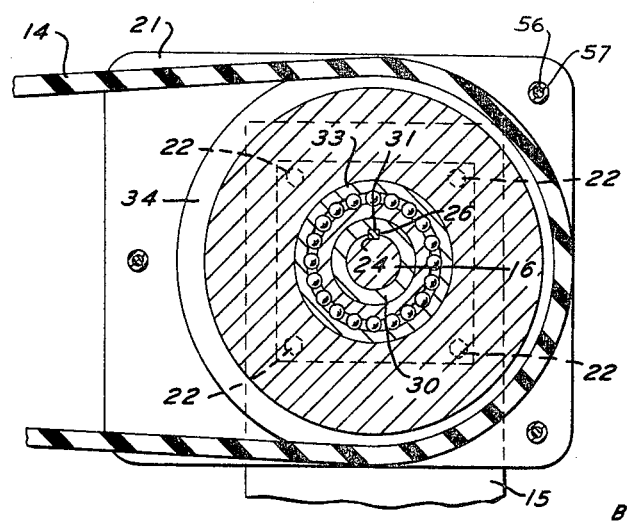

United States Patent Office 3,268,040
Patented August 23, 1966

3,268,040
CLUTCH AND BRAKE MECHANISM
Jack Dreeben, Camden, N.J. (% Mercury Packaging Machinery Corp., 2601 N. Howard St., Philadelphia, Pa. 19133)
Filed July 2, 1964, Ser. No. 379,803
8 Claims. (Cl. 192—18)

This invention relates to clutch and brake mechanisms and more particularly to a device of this character which has a wide range of usefulness.

In the operation of package making machinery and particularly machines for forming and filling packages of synthetic plastic material in a continued repetitive operation, difficulties have ben encountered with the driving mechanisms heretofore available, and particularly where an intermittent or a limited extent of driving action was required with parts of the machine accurately positioned at the begnning and end of a forming and filling cycle.

Various mechanisms which include a combined clutch and brake have been proposed for different purposes, but these were complex in construction and not as reliable in operation as desired.

Particular difficulties have been encountered in connection with the termination of operation at an exact location at the end of a cycle, and in condition for initiation of a succeeding cycle.

It is the principal object of the present invention to provide a clutch and brake mechanism having a continuous driven input element with the output closely controlled as to stopping and starting.

It is a further object of the present invention to provide a combined clutch and brake in which the parts are of relatively simple construction, easy to assemble, and are free from likelihood of difficulty in use.

It is a further object of the present invention to provide an engageable member which is pressure operated in one direction, and spring retracted, and which upon movement in one direction is effective for driving and in the other direction for braking and holding.

It is a further object of the present invention to provide a combined brake and clutch having a continuously movable element, and an element coaxially mounted with respect thereto and movable toward and away from the continuously movable member for driving and for braking.

Other objects and advantageous features of the invention will be apparent from the description and claims.

The nature and characteristic features of the invention will be more readily understood from the following description, taken in connection with the accompanying drawings forming part thereof, in which:

FIG. 3 is a sectional view, enlarged, taken approximately on the line 3—3 of FIG. 2; and FIG. 4 is a sectional view, on a reduced scale, taken approximately on the line 4—4 of FIG. 3.

Figure 1:
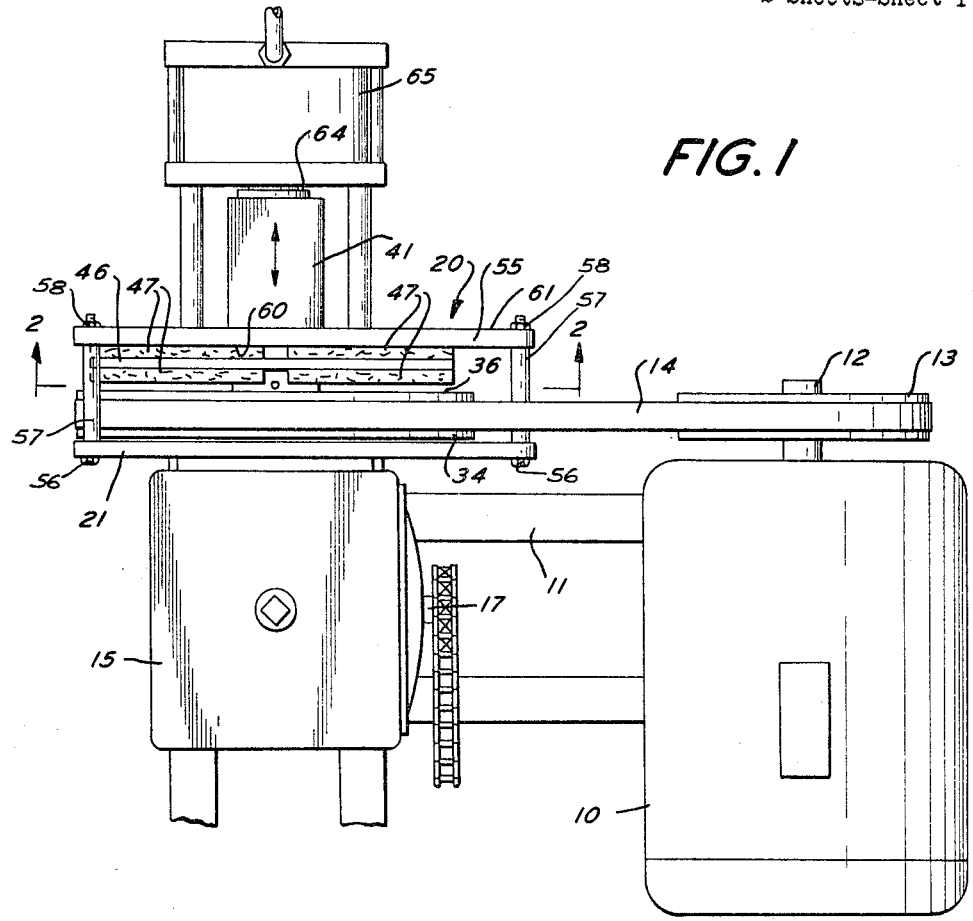
FIGURE 1 is a top plan view of operating mechanism having the combined clutch and brake of the present invention included therein.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, an electric motor 10 is shown, supported on a frame 11 and having a shaft 12 with a pulley 13 thereon. The pulley 13 has a "V" belt 14 in engagement therewith. Also mounted on the frame 11 is a device 15 to be driven, such as a speed reducer or the like, having an input shaft 16 and an output shaft 17.

The clutch and brake in accordance with the present invention and generally indicated at 20 preferably includes a frame plate 21 which may be substantially rectangular in shape and can be secured to the driven device 15 in any desired manner, such as by a plurality of studs 22. The frame plate 21 has a central opening 23 therein.

The shaft 16 has a keyway 24 therein with an upwardly inclined inner end 25 for the reception of a key 26 having a complemental end portion 27. The shaft 16 has mounted thereon in surrounding relation thereto and extending therebeyond a clutch and brake spline sleeve 30. The sleeve 30 has a keyway 31 with which the key 26 is in engagement.

The sleeve 30, radially outwardly of the shaft 16, has an external cylindrical portion 32 for the reception of a combined axial and longitudinal thrust bearing 33 on which a pulley 34 is mounted for free rotation. The pulley 34 has a shoulder 29 against which the outer race of the bearing 33 is in engagement. The sleeve 30 is limited in its movement along the shaft 16 toward the frame plate 21 by the key 26 and the engagement of its end portion 27 at the keyway inner end 25.

The pulley 34 has a peripheral groove 35 for engagement by the V-belt 14 and has a face 36 for driving engagement as hereinafter described.

The pulley 34 may be retained against longitudinal displacement toward the frame plate 21 by a split ring 37 in a groove 38 in the sleeve 20, and a set screw 39 may be provided for retaining the key 26 and sleeve 30 in gripped relation. The sleeve 30, outwardly of the shaft 26 and extending beyond the end of the shaft 26, has an extension 40 which is polygonal, and preferably square, on the exterior thereof for the mounting of a sleeve portion 41 of a brake disc mounting sleeve 42 which has an interior shape complemental to the exterior shape of the extension 40.

The sleeve 42 has an abutment 43 secured thereto in the interior thereof, and spaced inwardly from the outer end thereof. A spring 44 interposed between the end of the sleeve 30 and the abutment 43 normally urges the mounting sleeve 42 toward the right as seen in FIG. 3.

The spring 44 preferably has a predetermined spring force in accordance with the braking action desired. The braking action can be increased or decreased by employing a spring 44 which applies a greater or lesser force. The spring force can be changed by the insertion of a shim 45 of the desired thickness between the end of the spring 44 and the abutment 43.

Figure 2:
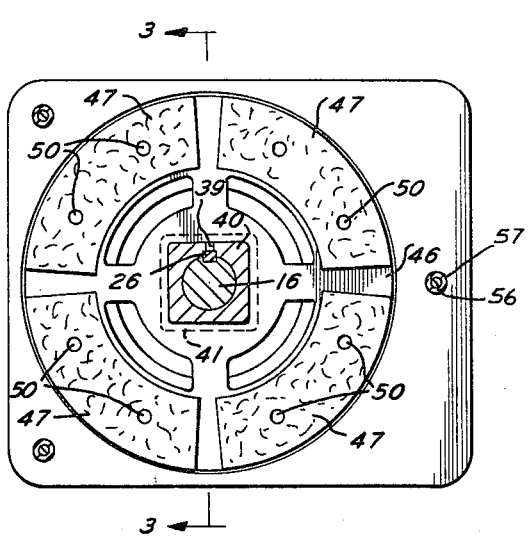
FIG. 2 is a vertical sectional view taken approximately on the line 2—2 of FIG. 1.

The mounting sleeve 42 has a disc 46 secured thereto with a plurality of segments 47 of friction brake material on the opposite faces 48 and 49 thereof secured thereto in any desired manner, such as by rivets 50. The segments 47 are preferably spaced apart at their ends, as shown in FIG. 2, to facilitate air circulation for cooling.

A frame plate 55 is provided, mounted in spaced parallel relation to the plate 21 and held by studs 56 having spacer sleeves 57 thereon between the plates 21 and 55 and nuts 58, for retaining the same in predetermined assembled and spaced relation. The plate 55 has a central opening 59 and an interior face 60 against which the friction segments 47 on the side face 48 of the disc 46 can engage and has an outer face 61 against which the nuts 58 on the studs 56 engage.

The brake disc mounting sleeve 42 can be moved axially in any desired manner but one suitable arrangement for this purpose comprises a combined radial and axial thrust, bearing 62 mounted in the end of the seeve 42 and engaging the abutment 43. A bearing shoulder pin 63 carried in the bearing 62 has a shoulder 64 engaged at the outer face of the bearing 62. The bearing shoulder pin 63 can be urged against the force of the spring 44 in any desired manner but for this purpose a diaphragm operated motor 65 is shown.

It will be noted that upon removal of the nuts 58 from the studs 56 the frame plate 55 can be readily removed, the mounting sleeve 42 retracted, and access can be had to the pulley 34 for mounting, or removing for replacement, the belt 44 in engagement with the pulley 34.

The mode of operation should be apparent from the foregoing but will be reviewed briefly.

If the motor 10 is energized to rotate its shaft 12 and pulley 13, the pulley 34 will be rotated continuously by the belt 14.

The friction segments 47 carried on the face 49 engage the face 60 and hold the disc 46 and the sleeve 42 against rotation.

It it is desired to drive the shaft 16, actuation of the fluid motor pressure 65 causes the bearing shoulder pin 63 to apply a force against the bearing 62 and abutment 43 to urge the mounting sleeve 42 against the force of the spring 44. Movement of the sleve 42 toward the left as seen in FIG. 3 brings the friction segments 47 carried on the face 48 into engagement with the side face 36 of the pulley 34 to drive the disc 46 and the parts rigid therewith.

Rotation of the shaft 16 is effected from the pulley 34 through the disc 46, the mounting sleeve 42, the sleeve 30, and the key 26 in the keyways 31 and 24.

Upon release of the pressure applied by the fluid pressure motor 62, the spring 44 is immediately effective to retract the mounting sleeve 42 and the disc 46 so as to quickly bring the friction segments 47 into engagement with the face 60 thereby bringing the shaft 16 to rest with the pulley 34 continuing its rotation and ready for driving. The retraction is rapid so that stopping of the disc 46 and the parts connected thereto including the shaft 16 is speedily affected.

The operation can be repeated as desired and as required.

I claim:
1. A clutch and brake mechanism comprising
  a first frame plate and a second frame plate in spaced relation thereto,
  members for supporting one of said frame plates,
  members for removably securing the frame plates in spaced relation,
  a power input pulley interposed between said frame plates,
  a power take off sleeve in the space between said frame plates having a bearing mounting portion and a polygonal extension with a terminal end,
  a combined radial and thrust bearing on said bearing mounting portion of said sleeve on which said pulley is freely rotatably mounted,
  a mounting sleeve having a portion complemental to said extension and in longitudinal sliding engagement therewith,
  a disc secured to said sleeve between said pulley and one of said frame plates and having opposite faces, each of said disc faces having friction members thereon for selective engagement with said pulley face and with said frame plate,
  an abutment member in said mounting sleeve,
  a spring interposed between said abutment member and said terminal end urging said mounting sleeve in one direction to engage the friction members on one face of said disc with said one of said frame plates, and
  a member for urging said mounting sleeve in the opposite direction to engage the friction members on the other face of said disc with said pulley face.

2. A clutch and brake mechanism as defined in claim 1 in which
  said friction members are segmental and in spaced relation for air circulation therebetween.

3. A clutch and brake mechanism as defined in claim 1 in which
  said mounting sleeve has a bearing therein engaging said abutment and with which said last member is in engagement.

4. A clutch and brake mechanism as defined in claim 1 in which
  said take off sleeve has a takeoff shaft therein,
  said shaft has a keyway with an outwardly extending end portion,
  a key is provided engaging said takeoff sleeve and in said shaft keyway, and
  said key has an outwardly extending portion for engagement with the end portion of said keyway thereby limiting movement of said takeoff sleeve along said shaft.

5. A clutch and brake mechanism comprising
  a power input pulley having a side face,
  a power take off sleeve having an interengageable portion,
  a bearing on said sleeve on which said pulley is freely rotatably mounted,
  a mounting sleeve in slidable engagement with said power take off sleeve and having an interengageable portion engaged with said first mentioned interengageable portion,
  a disc secured to said mounting sleeve in spaced relation to said pulley and having opposite faces,
  friction members on said disc faces, the friction members on one of said faces being engageable with the side face of said pulley,
  a frame plate having an inner face for engagement by the friction members on the other of said disc faces,
  a member for urging said disc in one direction and engaging the friction members on one of said disc faces with said pulley side face, and
  a member for urging said disc face in the opposite direction and engaging the friction members on the other of said disc faces with said frame plate inner face,
  said mounting sleeve having a bearing therein, and
  said member for urging said disc in one direction being in engagement with said bearing.

6. A clutch and brake mechanism comprising
  a power input pulley having a side face,
  a power take off sleeve having a polygonal extension,
  a bearing on said sleeve on which said pulley is freely rotatably mounted,
  a mounting sleeve having a portion complemental to said extension and in slidable engagement therewith,
  a disc secured to said mounting sleeve in spaced relation to said pulley and having opposite faces,
  friction members on said disc faces, the friction members on one of said faces being engageable with the side face of said pulley,
  a frame plate having an inner face for engagement by the friction members on the other of said disc faces,
  a member for urging said disc in one direction and engaging the friction members on one of said disc faces with said pulley side face, and
  a member for urging said disc face in the opposite direction and engaging the friction members on the other of said disc faces with said frame plate inner face,
  said mounting sleeve having a bearing therein, and
  said member for urging said disc in one direction being in engagement with said bearing.

7. A clutch and brake mechanism comprising
  a power input pulley having a side face,
  a power take off sleeve having a polygonal extension, a bearing on said sleeve on which said pulley is freely rotatably mounted, a mounting sleeve having a portion complemental to said extension and in slidable engagement therewith, a disc secured to said mounting sleeve in spaced relation to said pulley and having opposite faces, friction members on said disc faces, the friction members on one of said faces being engageable with the side face of said pulley, a frame plate having an inner face for engagement by the friction members on the other of said disc faces, a member for urging said disc in one direction and engaging the friction members on one of said disc faces with said pulley side face, and a member for urging said disc face in the opposite direction and engaging the friction members on the other of said disc faces with said frame plate inner face, said mounting sleeve having an abutment therein, said take off sleeve having an end within said mounting sleeve spaced from said abutment, and said last member being a spring interposed between said take off sleeve end and said abutment.

8. A clutch and brake mechanism comprising a first frame plate and a second frame plate in spaced relation thereto, members for supporting one of said frame plates, members for removably securing the frame plates in spaced relation, a power input pulley interposed between said frame plates, a power take off sleeve in the space between said frame plates having a bearing mounting portion and an interconnecting portion, a combined radial and thrust bearing on said bearing mounting portion of said sleeve on which said pulley is freely rotatably mounted, a mounting sleeve in logitudinal sliding engagement with said power take off sleeve and having an interconnecting portion in engagement with said interconnecting portion of said power take off sleeve, a disc secured to said sleeve between said pulley and one of said frame plates and having opposite faces, each of said disc faces having friction members thereon for selective engagement with said pulley face and with said frame plate, said mounting sleeve having an abutment portion, a spring engaging said abutment portion urging said mounting sleeve in one direction to engage the friction members on one face of said disc with said one of said frame plates, and a member for urging said mounting sleeve in the opposite direction to engage the friction members on the other face of said disc with said pulley face, said mounting sleeve having a bearing therein with which said last member is in engagement.

References Cited by the Examiner

UNITED STATES PATENTS

| | | | |
|---|---|---|---|
| 2,183,401 | 12/1939 | Judelshan | 192—66 |
| 2,348,025 | 5/1944 | Peets et al. | 192—18 X |
| 2,985,992 | 5/1961 | Dowdle | 192—18 |
| 3,202,252 | 8/1965 | Schilling | 192—66 X |

FOREIGN PATENTS 920,422  11/1954  Germany.

DAVID J. WILLIAMOWSKY, *Primary Examiner.*

DON A. WAITE, *Examiner.*

B. W. WYCHE, *Assistant Examiner.*